(12) United States Patent
Oklejas, Jr.

(10) Patent No.: US 6,345,961 B1
(45) Date of Patent: Feb. 12, 2002

(54) HYDRAULIC ENERGY RECOVERY DEVICE

(75) Inventor: Eli Oklejas, Jr., Monroe, MI (US)

(73) Assignee: Fluid Equipment Development Company, Monroe, MI (US)

( * ) Notice: Subject to any disclaimer, the term of this patent is extended or adjusted under 35 U.S.C. 154(b) by 0 days.

(21) Appl. No.: 09/491,769

(22) Filed: Jan. 26, 2000

Related U.S. Application Data (60) Provisional application No. 60/163,039, filed on Nov. 2, 1999, and provisional application No. 60/117,293, filed on Jan. 26, 1999.

(51) Int. Cl.$^7$ .............................................. F04B 17/00
(52) U.S. Cl. ..................... 417/365; 417/407; 415/104
(58) Field of Search ................. 417/365, 405, 417/406, 407; 415/104, 106, 107, 208.3, 224.5

(56) References Cited

U.S. PATENT DOCUMENTS

| | | | |
|---|---|---|---|
| 1,066,581 A | * | 7/1913 | Brown ........................ 415/104 |
| 2,715,367 A | * | 8/1955 | Kodet et al. ................ 417/407 |
| 3,614,259 A | * | 10/1971 | Neff ............................ 415/205 |
| 3,969,804 A | * | 7/1976 | Macinnes et al. ........... 417/407 |
| 4,187,173 A | | 2/1980 | Keefer |
| 4,230,564 A | | 10/1980 | Keefer |
| 4,255,081 A | | 3/1981 | Okleias et al. |
| 4,432,876 A | | 2/1984 | Keefer |
| 4,472,107 A | * | 9/1984 | Chang et al. ............... 415/104 |
| 4,830,572 A | | 5/1989 | Okleias et al. |
| 4,966,708 A | | 10/1990 | Okleias et al. |
| 4,973,408 A | | 11/1990 | Keefer |
| 4,983,305 A | | 1/1991 | Okleias et al. |
| 5,049,045 A | * | 9/1991 | Oklejas et al. .............. 417/365 |
| 5,082,428 A | | 1/1992 | Okleias et al. |
| 5,106,262 A | | 4/1992 | Okleias et al. |
| 5,133,639 A | * | 7/1992 | Gay et al. ................. 415/170.1 |
| 5,340,286 A | * | 8/1994 | Kanigowski ................ 417/407 |
| 5,819,524 A | | 10/1998 | Boslev et al. |
| 5,951,169 A | | 9/1999 | Okleias et al. |
| 5,980,114 A | | 11/1999 | Okleias, Jr. |
| 6,036,435 A | | 3/2000 | Okleias |

FOREIGN PATENT DOCUMENTS

| | | | | |
|---|---|---|---|---|
| DE | 3100879 A | * | 8/1982 | .................. 415/104 |

* cited by examiner

Primary Examiner—Cheryl J. Tyler
(74) Attorney, Agent, or Firm—Kevin G. Mierzwa (57) ABSTRACT

A hydraulic pressure booster includes a housing having a pump portion, a shaft portion and a turbine portion. The pump portion has a pump inlet and a pump outlet. The turbine portion has a turbine inlet and a turbine outlet. The turbine portion and pump portion are fluidically separated by the shaft portion. A shaft is supported by a bearing within the shaft support portion. The shaft extends between the pump portion and turbine portion and has a pump impeller and a turbine impeller located in its respective portion. The shaft defines an axis of the housing. A thrust load reducer is provided within the turbine portion to reduce axial thrust toward the thrust bearing.

24 Claims, 7 Drawing Sheets

HYDRAULIC ENERGY RECOVERY DEVICE

RELATED APPLICATION

The present application claims priority to provisional U.S. patent applications Ser. Nos. 60/117,293 filed on Jan. 26, 1999 and 60/163,039 filed on Nov. 2, 1999, both of which are hereby incorporated by reference.

TECHNICAL FIELD

The present invention relates generally to a turbine and pump, and more specifically, to a combination turbine and pump designed to reduce thrust loads therein.

BACKGROUND OF THE INVENTION

Various industrial processes require the use of high pressures for the fluids used in the processes. The liquids may include gases used for chemical reactions such as natural gas purification or liquids such as those used in various chemical processes. These processes may also include reverse osmosis desalinization of ocean water to produce drinking water.

As the cost of energy continues to rise, engineers increasingly search for ways in which to reduce the overall power consumption in the industrial processes. Oftentimes, the industrial processes that employ high pressure fluid require that the output of the process eventually returns to ambient pressure. To reduce the pressure of the output fluid, typically a multitude of piping and valves are employed. The piping and valves increase the cost of the overall process and increase the maintenance costs of such a system.

Various means have been employed to recover energy from the discharge of such processes. Oftentimes, these energy recovery devices are expensive to manufacture, have high installation costs, and are not very reliable. Further, such systems are not capable of regulating the pressure and flow rates of the fluid streams. For various processes, regulation of the flow rates and pressures is important.

It would therefore be desirable to provide an energy recovery device capable of reducing the overall energy consumption of a process as well as reducing the drawbacks of the prior art outlined above.

SUMMARY OF THE INVENTION

It is therefore one object of the invention to provide an energy recovery device that may be integrated easily into standard processes to reduce the overall energy consumption of the processes. Consequently, certain equipment cost savings due to a reduction in pump sizes may also be achieved.

In one aspect of the invention, a hydraulic pressure booster comprises a housing having a pump portion, a shaft portion and a turbine portion. The pump portion has a pump inlet and a pump outlet. The turbine portion has a turbine inlet and a turbine outlet. The turbine portion and pump portion are fluidically separated by the shaft portion. A shaft is supported by a bearing within the shaft support portion. The shaft extends between the pump portion and turbine portion and has a pump impeller and a turbine impeller located in its respective portion. The shaft defines an axis of the housing. A thrust load reducer is provided within the turbine portion to reduce axial thrust toward the thrust bearing.

One feature of the invention is that the thrust load reducer may comprise a bleed hole that is used to establish fluid communication between a turbine impeller cavity and a turbine eye. Leakage through the bleed hole to the turbine impeller eye strengthens the fluid vortex adjacent to the inboard shroud of the turbine impeller and thereby reduces the average pressure acting on the turbine impeller. This reduces the amount of axial thrust imposed on the thrust bearing.

Another feature of the invention is that the thrust load reducer may comprise radial grooves located in the inboard turbine shroud that generates a strong vortex motion between the turbine impeller and the center bearing. The vortex causes a reduction in the average pressure acting on the turbine impeller and thus reduces the load imposed on the thrust bearing. In addition, the bleed hole and radial grooves may be used together to produce a further reduction in pressure and thereby further reduce axial thrust.

Yet another feature of the invention is that the thrust load reducer may comprise a turbine seal ring attached to the inboard shroud of the turbine impeller and a stationary seal ring that is integral with the adjacent face of the center bearing. The two adjacent faces of the turbine seal ring and the stationary seal ring overlap and define a balance space therebetween. A channel fluidically couples the impeller eye and the balance space. The pressure in the balance space is thus lower than that which would normally exist adjacent to the inboard shroud of the turbine impeller. Thus, the axial thrust is reduced thereby.

In another aspect of the invention, a hydraulic pressure booster comprises a housing having a pump portion, a shaft support portion and a turbine portion. The pump portion has a pump inlet, a pump outlet. The turbine portion has a turbine inlet and a turbine outlet. The booster has a unitary rotor having a shaft, an pump impeller and a turbine impeller. A center bearing has a first piece and a second piece positioned between the housing and the shaft. The center bearing rotatably couples the shaft to the housing. A first seal and a second seal are positioned between the housing and the center bearing. The first seal, second seal, bearing and housing define an annular space. The first seal has a notch to fluidically couple the annular space to the pump so that the annular space has a first pressure substantially the same as a pump pressure to provide a radially inward force on the first piece and the second piece during operation of the pump.

One advantage of the invention is that the housing may be formed so that the pump volute region is offset toward the pump inlet in an axial direction. This advantageously allows the pump outlet and turbine inlet to be positioned on the same side of the housing.

Another advantage of the invention is that a combination volute and diffuser ring is used. This allows the volute and diffuser ring to be removed and replaced depending on the desired characteristics of a particular pump.

Other objects and features of the present invention will become apparent when viewed in light of the detailed description of the preferred embodiment when taken in conjunction with the attached drawings and appended claims.

DETAILED DESCRIPTION OF THE PREFERRED EMBODIMENT

In the following figures, the same references numerals will be used to identify identical components in the various views.

The present invention is described with respect to various preferred embodiments and preferred system uses for the hydraulic pressure booster of the present invention. One skilled in the art would recognize various alternatives without varying from the spirit of the invention.

Figure 1:
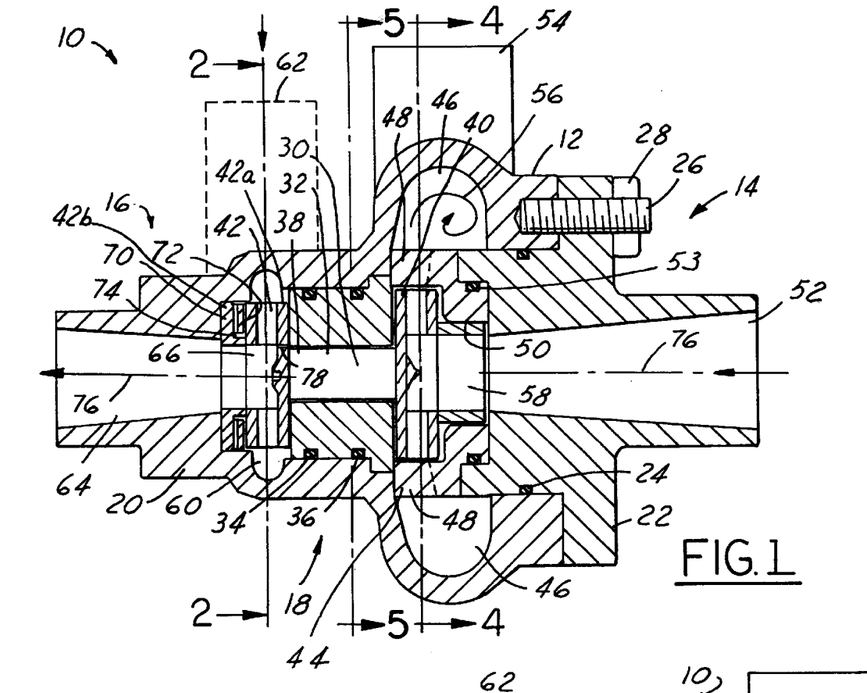
FIG. 1 is a longitudinal cross-sectional view of a hydraulic pressure booster having a first embodiment of a thrust load reducer according to the present invention.

Referring now to FIG. 1, a hydraulic pressure booster 10 has a housing 12 that encloses a pump portion 14, a turbine portion 16, and a shaft portion 18.

Housing 12 is formed of a casing 20 and an end cap 22. An O-ring 24 provides sealing between end cap 22 and O-ring 24. A stud 26 and nut 28 is used to secure end cap 22 to casing 20. Although only one stud 26 and one nut 28 are illustrated, a plurality of studs and nuts may be used as would be evident to those skilled in the art.

Shaft portion 18 has a center bearing 30 used to support a rotor 32. As will be further described below in FIG. 5, center bearing 30 is preferably a two piece center bearing that is positioned within shaft support portion 18 by a first O-ring 34 and a second O-ring 36. O-rings 34 and 36 prevent fluid leakage between pump portion 14 and turbine portion 16.

Rotor 32 has a shaft 38, a pump impeller 40, and a turbine impeller 42. Preferably, shaft 38, pump impeller 40, and turbine impeller 42 are formed of a single piece rather than being formed of two or more pieces held together by mechanical fasteners. A one piece rotor is stiffer and more easily balanced to a high degree which enables smooth high-speed operation.

A diffuser/wear ring 44 is positioned within pump portion 14. Diffuser/wear ring 44 is held in place by end cap 22 against casing 20. Diffuser/wear ring 44 surrounds the outer periphery of pump impeller 40. A pump volute 46 is defined between diffuser/wear ring 44, end cap 22, and casing 20. Diffuser/wear ring 44 has a plurality of diffuser channels 48 that allow fluid communication between fluid adjacent to impeller 40 and pump volute 46. Diffuser channels 48 have a shape optimized for maximum conversion of fluid velocity into fluid static pressure. Diffuser/wear ring 44 extends radially inward to form a close radial clearance with impeller between wear ring portion 50 of diffuser/wear ring 44 to restrict leakage from the periphery of pump impeller 40 into a feed inlet 52. An O-ring 53 provides sealing between diffuser/wear ring 44 and end cap 22. Feed inlet 52 is defined within end cap 22. Feed inlet 52 is in fluid communication with pump impeller eye 58.

A pump outlet 54 is defined within casing 20. Pump outlet 54 is in fluid communication with pump volute 46. Pump volute 46 is offset toward feed inlet 52 with respect to diffuser channels 48. Commonly, the volute of a pump is centered adjacent to the diffuser. The offset provides clearance between pump outlet 54 and turbine portion 16. The offset location of pump volute 46 relative to diffuser channels 48 results in the generation of a tangential vortex flow in volute 46 during operation as indicated by arrow 56. The vortex helps reduce development of stagnant flow in diffuser channels 48 which improves the efficiency of the diffusion process.

A turbine impeller cavity 60 surrounds turbine impeller 42 and is defined by casing 20. Turbine impeller cavity has a turbine inlet 62 and a turbine outlet 64. Turbine inlet 62 may be advantageously placed on the same side of housing 12 as pump outlet 54 due to the offset location of pump outlet 54.

Turbine impeller has an inner shroud 42a and an outer shroud 42b. Turbine impeller 42 has a turbine impeller eye 66 in fluid communication with turbine outlet 64 and between shrouds 42a, 42b. As will be further described below, fluid within turbine inlet 62 has a generally tangential flow to turbine impeller and thus causes turbine impeller 42 to rotate. Fluid leaves turbine impeller 42 through turbine impeller eye 66.

A thrust bearing 70 has a face 72 that is parallel to the outer face of turbine impeller 42. A channel 74 couples fluid from turbine impeller cavity 60 to the region between face 72 and turbine impeller 42. Thus, a thin film of fluid prevents rubbing contact between turbine impeller 42 and thrust bearing 70. Various embodiments of thrust bearing are provided in U.S. Pat. No. 5,980,114 entitled "Thrust Bearing", which is incorporated by reference herein. The thrust capacity of the hydraulic pressure booster 10 is defined by the maximum amount of thrust load acting in a direction parallel with a longitudinal axis 76 of housing 12 toward bearing 70. Longitudinal axis is co-extensive with shaft 38. Thrust loads are developed by the rotor during operation of hydraulic pressure booster 10.

To minimize thrust, when the thrust load is increased, a thrust load reducer such as a bleed hole 78 may be provided. Bleed hole 78 is a channel provided in the inboard shroud 42a of turbine impeller 42 near shaft 38. Bleed hole 78 provides fluid communication between turbine impeller cavity 60 and turbine impeller eye 66. Leakage through bleed hole 78 greatly strengthens the fluid vortex adjacent to the inboard shroud of turbine impeller 42. Thus, the average pressure acting on the turbine impeller 42 is reduced. Therefore, the amount of axial force imposed on thrust bearing 70 is reduced. Thus, thrust load reducer provides the net effect of a force in a n axial direction toward pump portion 14 (away from thrust bearing 70). The intensified vortex between bearing 30 and inner shroud 42a that is caused by the inward flow of high velocity fluid from turbine inlet 62 toward bleed hole 78 has a substantial amount of angular momentum.

Advantageously, the intensified vortex and reduced thrust occurs if turbine impeller 42 is not rotating, as during start up. This may allow turbine impeller 42 to "break free" from thrust bearing 70 during start up.

Bleed hole 78 is preferably sized to have a diameter of about between ten percent and about fifteen percent of the total diameter of the primary turbine nozzle as will be described below.

Figures 2, 3:
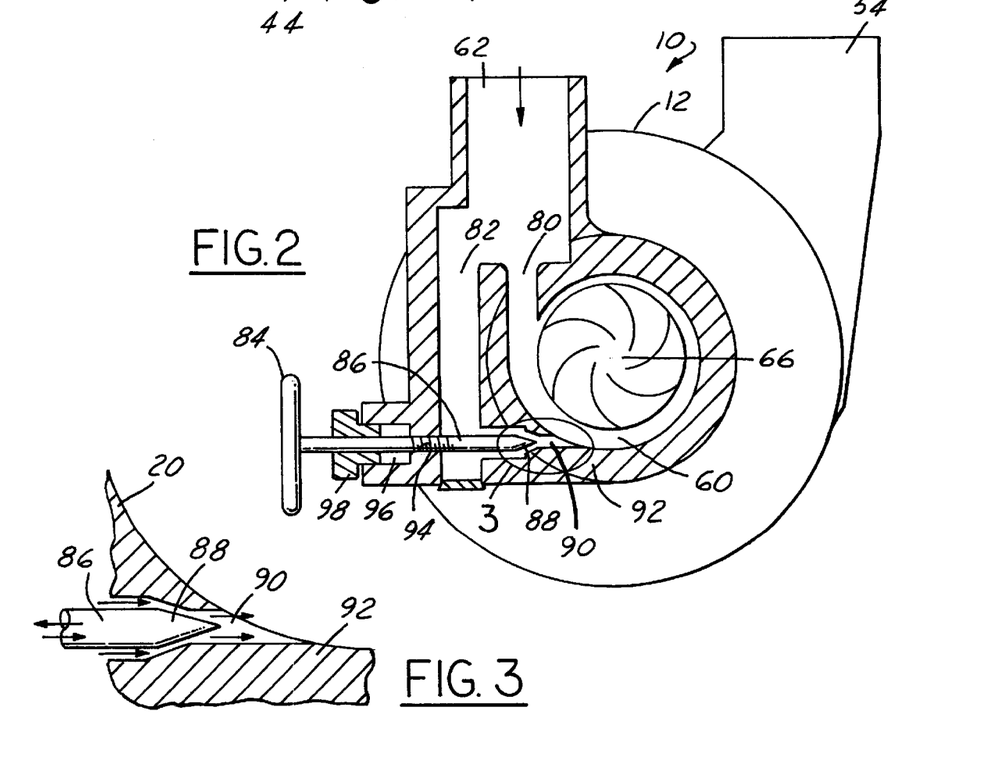
FIG. 2 is a cross-sectional view along line 2—2 illustrating a secondary nozzle bore.
FIG. 3 is an enlarged cross-sectional view of a nozzle portion of FIG. 2.

Referring now to FIGS. 2 and 3, a cross-sectional view along line 2—2 of FIG. 1 is illustrated. Fluid flow from turbine inlet 62 enters a turbine nozzle 80 which is in fluid communication with impeller cavity 60. As described above, bleed hole 78 is preferably ten to fifteen percent of the diameter of primary nozzle 80. Oftentimes, the flow of high pressure fluid from turbine inlet 62 requires regulation of flow and pressure through turbine portion 16. A secondary nozzle passage 82 is in fluid communication with turbine impeller cavity 60. Secondary nozzle passage 82 is selectively operated by a valve 84. Valve 84 has a valve stem 86 with a seal end 88 that is tapered to fit within a secondary nozzle 90 in an impeller cavity wall 92. Valve stem 86 has a threaded portion 94 that allows valve stem 86 to travel into and out of secondary nozzle 90. Packing 96 provides sealing around valve stem 86. Packing 96 is compressed for proper sealing by gland 98. Second nozzle passage 82 preferably has a diameter that is about fifty percent of the diameter of primary nozzle 80. Thus, if the turbine flow rate needs to be increased, valve stem 86 is withdrawn from secondary nozzle 90 so that flow from turbine inlet 62 enters turbine impeller cavity 60 through secondary nozzle 90. Because of the angular tip on valve stem 86, the amount of flow through secondary nozzle 90 may be easily regulated. Thus, if product flow into turbine impeller cavity 60 is desired to be reduced, valve stem 86 may be rotated into secondary nozzle 90.

Figures 4, 5, 6, 7:
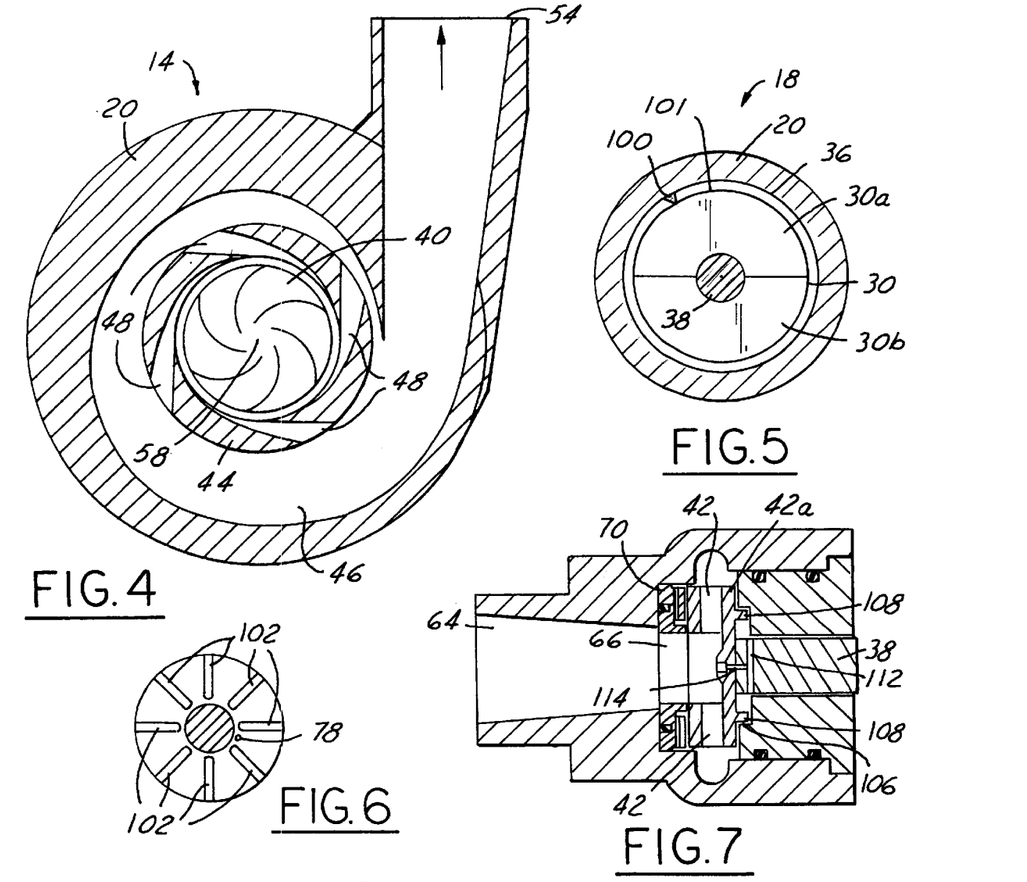
FIG. 4 is a cross-sectional view through line 4—4 of FIG. 1 through shaft support portion.
FIG. 5 is a lateral cross-sectional view along line 5—5 of FIG. 1 through pump portion.
FIG. 6 is an end view of an impeller for reducing thrust load according to a second embodiment of the present invention.
FIG. 7 is a longitudinal cross-sectional view of a hydraulic pressure booster having a second embodiment of a thrust load reducer according to the present invention.

Referring now to FIG. 4, a cross-sectional view through pump portion 14 is illustrated. Diffuser/wear ring 44 is shown having diffuser channels 48 extending therethrough. Diffuser channels 48 provide fluid communication between pump volute 46 and pump impeller 40. Thus, as illustrated, impeller 40 rotates in a counterclockwise direction so that fluid from within impeller eye 58 exits through diffuser channels 48 and high pressure fluid exits through pump outlet 54.

In contrast to prior known pumps, the present invention provides a combination volute and diffuser ring. Most known pumps use a cast volute due to the low manufacturing cost. However, in any given volute design, efficiency at only one flow angle of fluid exiting the impeller is formed. Thus, when the flow deviates from the volute angle that is fixed by the cast shape, the volute efficiency is decreased. In the present invention, the diffuser/wear ring 44 is preferably a single small piece that is easily removable. Thus, the diffuser channels may be custom machined so that the impeller flow angle matches the optimal flow angle of the volute, which is fixed by the casting design. Furthermore, if the design conditions should change after installation of the unit, a new diffuser/wear ring 44 may be manufactured and installed in hydraulic pressure booster 10 to meet the new operating conditions at a small fraction of the cost of supplying a new casing with a different volute.

Referring now to FIGS. 1 and 5, FIG. 5 illustrates a cross-sectional view through shaft support portion 18 of FIG. 1. Preferably, rotor 32 is a single integrally formed piece having pump impeller 40, turbine impeller 42, and shaft 38. In this manner, therefore, center bearing 30 is preferably formed of two bearing pieces 30A and 30B. Because pump portion 14 and turbine portion 16 are at different pressures, O-rings 34 and 36 are provided to prevent leakage therebetween. It should also be noted that the region pressure in the adjacent to pump impeller 40 is significantly higher than the pressure in turbine impeller cavity 60. The pressure adjacent to pump impeller 40 is also significantly higher than the average pressure in the clearance between shaft 38 and bearing 30.

A notch 100 in O-ring 36 is provided to allow high pressure from the area adjacent to pump impeller 40 into the annular area 101 between center bearing 30, casing 20, and up to O-ring 34. The pressure puts the center bearing 30 in compression and thus prevents the bearing portions 30A and 30B from separating during operation. Separations may interfere with the rotation of shaft 38. Also, by placing bearing portions 30A and 30B under compression, the tendency for the bearing materials such as ceramic to crack is reduced. One advantage of such an assembly is that the center bearing portions 30A and 30B are only under pressure induced compression during the operation of the hydraulic pressure booster when the pump portion 14 is operating. Consequently, the insertion and removal of center bearing 30 is relatively easy.

Referring now to FIG. 6, another embodiment of a thrust load reducer is illustrated. In this embodiment, bleed hole 78 may be eliminated. In this embodiment, radial grooves 102 are formed in inner turbine shroud 42a. The radial grooves generate a strong vortex motion between turbine impeller 42 and center bearing 30. The vortex reduces the average pressure acting on the turbine impeller thus reducing the thrust load on thrust bearing 70. Alternatively, the bleed hole 78 may be included in addition to radial grooves 102 to provide a further reduction in the pressure acting on the turbine impeller.

Radial grooves 102 do not extend through shroud 42a. Radial grooves 102 preferably are approximately 4% of the turbine impeller diameter and do not extend radially to shaft 38.

Referring now to FIG. 7, yet another alternative embodiment of a thrust load reducer is illustrated. In this embodiment, a stationary seal ring 106 is formed on center bearing 30. A turbine seal ring 108 is formed on the inner shroud 42a of turbine impeller 42. Stationary seal ring 106 and turbine seal ring 108 are preferably spaced apart by a small radial clearance. In the preferred embodiment, the clearance is less than 0.005". A balance space is defined between center bearing 30, turbine seal ring 108, shaft 38, and shroud 42a. A channel 114 through inner shroud 42a fluidically couples balance space 112 and turbine impeller eye 66. During operation, pressure in balance space 112 will be maintained at a pressure close to the pressure in turbine eye 66. This pressure is much lower than the pressure that would normally exist adjacent to the inboard shroud 42a of impeller 42. Thus, axial thrust imposed on thrust bearing 70 is greatly reduced. In most situations, the diameter of turbine seal rings 108 and stationary seal ring 106 will be experimentally determined to prevent too large of a reduction in thrust load. If too large of a thrust load is applied, turbine impeller 42 may pull away from thrust bearing 70 and create a leakage path between impeller 42 and turbine outlet 64. In a preferred embodiment, the diameter of the balance space 112 should be about 35–40% greater than the shaft diameter.

In operation of hydraulic pressure booster 10, high pressure product fluid enters turbine inlet 62. Fluid passes through primary nozzle 80 and potentially through secondary nozzle passage 82, if open. High velocity fluid enters turbine impeller cavity 60 and flows radially inward as it imparts a torque causing turbine impeller, shaft 38, and pump impeller 40 to rotate. Fluid flows along impeller and exits through turbine impeller eye 66 at low pressure. From turbine impeller eye 66 fluid leaves turbine portion through turbine outlet 64.

On the pump portion 14, feed enters hydraulic pressure booster 10 through feed inlet 52 and into pump impeller 40 through pump impeller eye 58. Fluid flows radially outward and the rotation of pump impeller 40 causes an increase in static pressure and tangential velocity in the feed stream. The feed fluid exits pump impeller 40 and enters diffuser channels 48. Diffuser channels 48 cause a reduction in fluid velocity and an increase in static pressure. The fluid exits diffuser channels 48 and enters pump volute 46 and leaves pump housing 12 through pump outlet 54. The flow continues through a tangential diffuser and through pump outlet 54. The tangential diffuser of pump outlet 54 converts any remaining flow velocity into static pressure.

Figure 8:
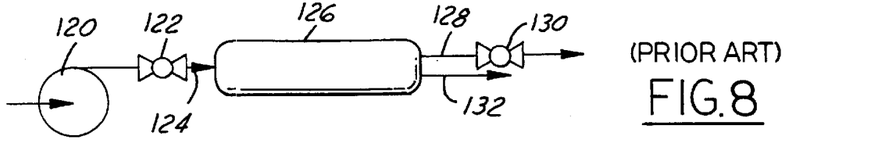
FIG. 8 is a schematic view of a prior art process using a single process chamber according to the present invention.

Referring now to FIG. 8, the present application has numerous industrial processing applications. In such processes, a process chamber 126 is employed where the fluid may undergo reactions, be purified or in some other way is changed. In these processes, at least some of the fluid exits the process chamber at a high pressure. Referring now to FIG. 8, a prior known process employs a feed pump 120 coupled through a control valve 122 to a process control chamber inlet 124 of a process chamber 126. Process chamber 126 has a first outlet 128 coupled to a control valve 130 and a second outlet 132. First outlet 128 may be a high pressure outlet. Second outlet 132 may, for example, be a low pressure outlet.

Figure 9:
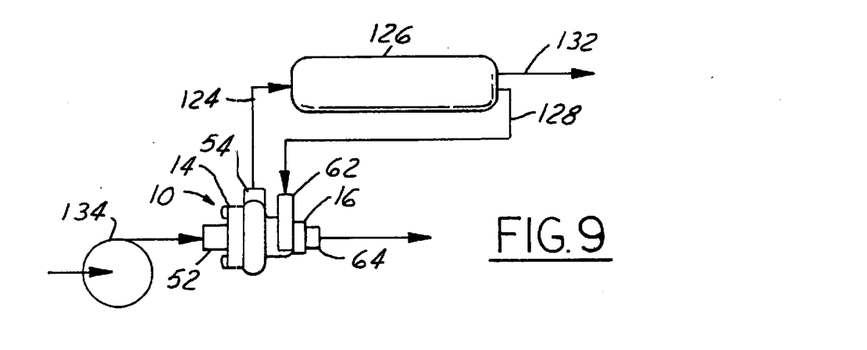
FIG. 9 is a schematic view of a process similar to that of FIG. 8 having a pressure booster therein.

Referring now to FIG. 9, hydraulic pressure booster 10 is incorporated into the flow of process with process chamber 126. In this embodiment, turbine portion 16 is coupled to an outlet 128 of process chamber 126. Pump portion 14 is coupled to process chamber inlet 124. That is, turbine inlet 62 is coupled to pump outlet 128 and feed inlet 52 is coupled to a feed pump 134. Pump outlet 54 is coupled to inlet 124 of process chamber 126. In operation, the hydraulic pressure booster 10 may provide between about 30 and about 70 percent of the total required process pressurization. Feed pump 134 is sized smaller than that illustrated in FIG. 8. Feed pump 134 provides the remaining pressurization between 70 and 30 percent respectively.

Hydraulic pressure booster 10 may employ a secondary nozzle as described above as 82. The secondary nozzle may be used to regulate the flow from turbine outlet 64.

In operation, the hydraulic pressure booster 10 is entirely energized by depressurization of the high pressure stream of process chamber 126. The pressure boost provided by hydraulic pressure booster 10 reduces the discharge pressure, the size of feed pump 134, and therefore the motor size of the feed pump. This results in a significant savings in capital costs as well as operating costs.

Figure 10:
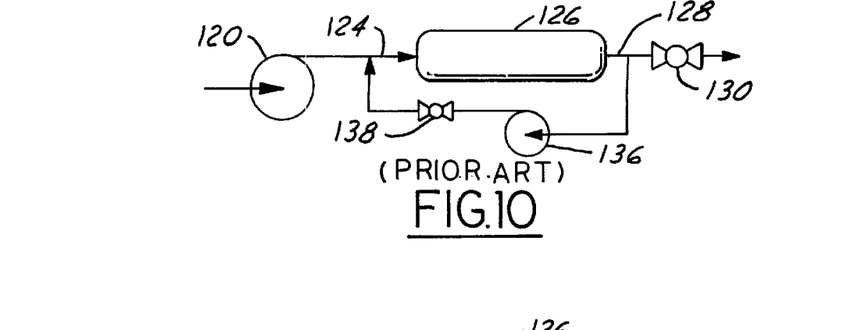
FIG. 10 is a schematic view of another single process chamber according to the prior art.

Referring now to FIG. 10, a prior art recirculation process is illustrated. Recirculation may be required to generate high turbulence in process chamber 126 to obtain a complete reaction. A feed pump 120 is coupled to inlet 124 of process chamber 126. Outlet 128 is coupled to a control valve 130 in a similar manner to FIG. 8 above. In this process, however, process chamber outlet 128 has a second feed pump 136 in series with a second control valve 138 that recirculates a portion of the output of process chamber 128 into inlet 124 of process chamber 126. Pump 136 acts as a circulation pump and boosts the fluid pressure into inlet 124.

Figure 11:
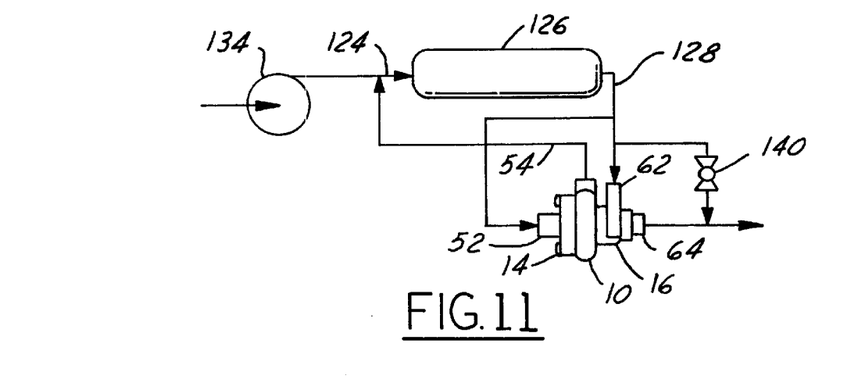
FIG. 11 is a schematic view of a process similar to FIG. 10 having a hydraulic pressure booster incorporated therein.

Referring now to FIG. 11, the process shown in FIG. 10 is updated with a hydraulic pressure booster 10 according to the present invention. In this process, both pump portion 14 and turbine portion 16 are coupled to the outlet 128 of process chamber 126. That is, turbine inlet 62 and pump feed inlet 52 are coupled to outlet 128. Pump outlet 54 is coupled to process chamber inlet 124. A bypass valve 140 is coupled between outlet 128 of process chamber 126 and turbine outlet 64. Bypass valve 140 regulates the flow through turbine portion 16.

In operation, a portion of the high pressure fluid from process chamber outlet 128 is directed to turbine portion 16 which in turn causes a portion of the fluid from outlet 128 to be pressurized by pump portion 14. Preferably, a secondary nozzle as described above as 82 may be used to regulate the rate of circulation. Also, adjustment of bypass valve 140 may also be used to regulate circulation.

Figure 12:
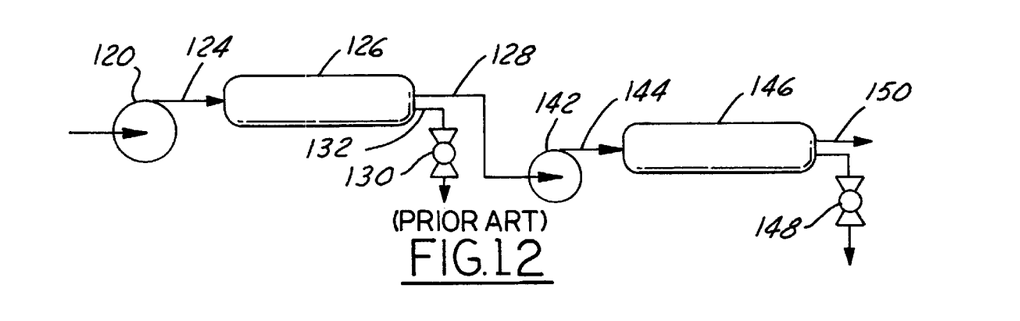
FIG. 12 is a schematic view of a two process chamber process according to the prior art.

Referring now to FIG. 12, a conventional two path process is illustrated. In such a process, feed pump 120 provides fluid to inlet 124 of process chamber 126. Control valve 130 regulates the output of process chamber 126. Outlet 128 of process chamber 126 is coupled to an interstage pump 142. Interstage pump 142 boosts the pressure of the partially processed fluid from process chamber 126. Interstage pump 142 is coupled to inlet 144 of second process chamber 146. Waste exits through second control valve 148. Fully processed fluid exits through outlet 150.

Figure 13:
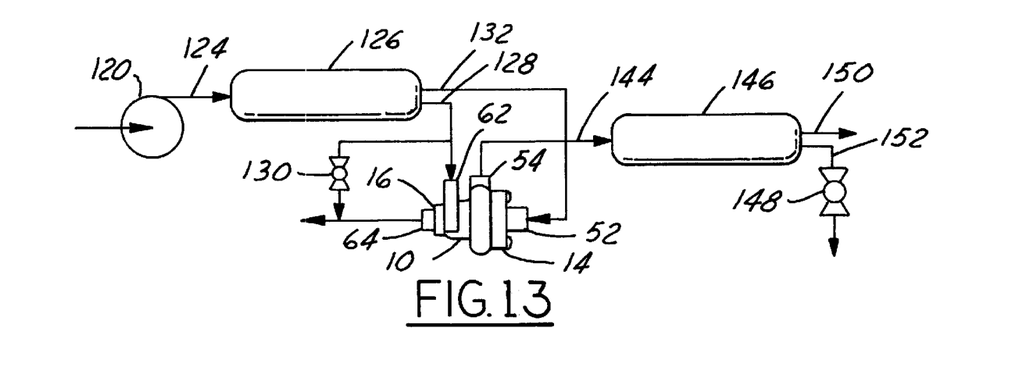
FIG. 13 is a schematic view of a two process chamber having a hydraulic pressure booster according to the present invention.

Referring now to FIG. 13, a two path process similar to that shown in FIG. 12 above is illustrated using a hydraulic pressure booster 10. Hydraulic pressure booster 10 has its turbine portion 16 coupled to first outlet 128, which may be a waste outlet. Outlet 128 provides a high pressure stream to turbine portion 16. Low pressure partially processed feed from outlet 132 enters pump inlet 52 and is pressurized and exits hydraulic pressure booster 10 through pump outlet 54. The pressurized fluid from outlet 54 enters inlet 144 to second process chamber 146 for further processing. Bypass valve 130 controls the amount of high pressure fluid entering turbine portion 16. Opening bypass valve 130 decreases turbine flow and thus reduces the pressure of the fluid to second process chamber 146. By closing bypass valve 130, pressure to second process chamber 146 is increased.

In an alternative to FIG. 13, waste stream through control valve 148 of second process chamber 146 may also be used to drive a hydraulic pressure booster 10. For example, a hydraulic pressure booster may be coupled between control valve 148 and inlet 124 of first process chamber 126. In this manner, the size of feed pump 120 may be reduced.

Figure 14:
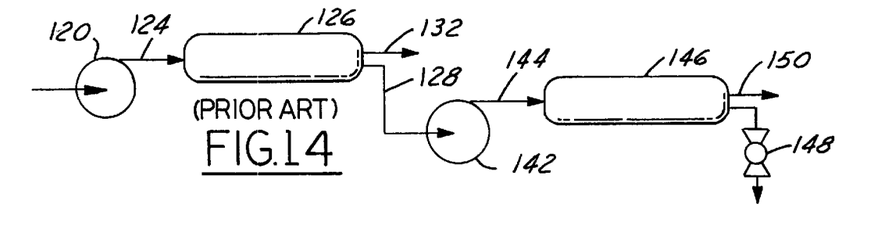
FIG. 14 is a schematic view of a two process prior art chamber having an interstage pump.

Referring now to FIG. 14, a known process similar to that shown in FIG. 12 is illustrated. In this process, however, the pressure is a stepped pressure. That is, the pressure in second process chamber 146 is increased compared to that in process chamber 126. Feed fluid is pressurized by pump 120 and is processed in process chamber 126. Fully processed fluid exits through second outlet 132. The remaining fluid exits through outlet 128 and the pressure is increased by booster pump 142. Further processing of fluid from booster pump 142 is performed in process chamber 146. Fully processed fluid exits through outlet 150 of second process chamber 146. A waste stream exits through valve 148. Valve 148 is used to regulate the waste stream flow and pressure.

Figure 15:
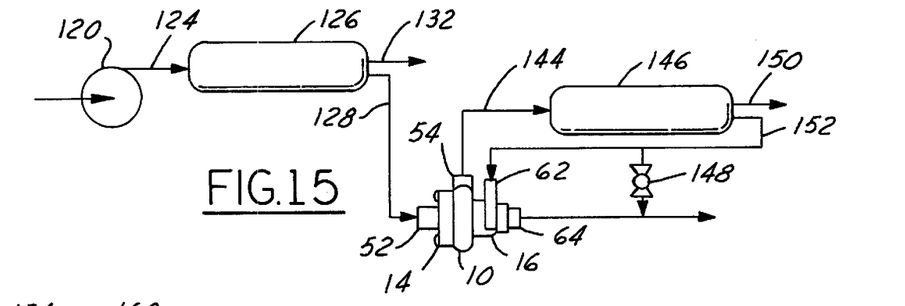
FIG. 15 is a schematic view of a two process chamber process having a hydraulic pressure booster according to the present invention.

Referring now to FIG. 15, a hydraulic pressure booster 10 has its turbine portion 16 coupled to high pressure waste stream 152 of the second process chamber 146. The waste stream 152 drives pump portion 14. Pump portion 14 is coupled to outlet 128 of process chamber 126. Thus, the output of process chamber 126 is pressurized by hydraulic pressure booster 10 before entering second process chamber 146 at inlet 144. Bypass valve 148 regulates the flow rate through turbine portion 16 of hydraulic pressure booster 10. A secondary nozzle such as that described above may also be used to precisely control the process pressure and flow.

Figure 16:
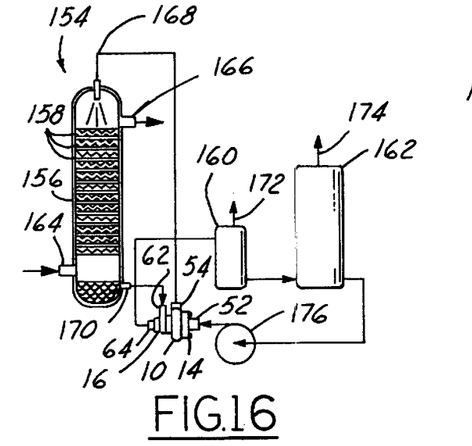
FIG. 16 is a schematic view of a natural gas purification system according to the present invention.

Referring now to FIG. 16, a natural gas purification system 154 is illustrated having a hydraulic pressure booster 10. Natural gas purification system 154 is an amine-based natural gas purification system. Natural gas purification system 154 has a contactor 156, having a plurality of purification trays 158 therein. System 154 also has a flash tank 160 and a stripper 162. Contactor 156 has a natural gas input 164 and a purified natural gas output 166. Contactor 156 also has an amine inlet 168 and an amine outlet 170. Generally, unpurified natural gas 164 travels into contactor 156. Impurities in the natural gas are stripped through the descending spray of amine which strips the natural gas of carbon dioxide and other impurities. The natural gas exiting natural gas outlet 166 has thus been purified by the amine. The amine leaving through amine outlet 170 has the impurities of the gas therein and is under pressure. Amine from outlet 170 is used to drive turbine portion 16 of hydraulic pressure booster 10. That is, amine outlet 170 is coupled to turbine inlet 62. Turbine outlet 64 is coupled to flash tank 160. In flash tank 160, some of the gaseous contaminants are released and vented through a port 172. The partially purified amine then travels into stripper 162 where it is heated to drive out remaining contaminants which are vented through a port 174. Lean amine travels from stripper 162 into a feed pump 176. Feed pump 176 partially boosts the amine pressure. Amine partially boosted by pump portion 14 of hydraulic pressure booster 10 is directed to amine inlet 168 of contactor 156. The pressure from amine outlet 170 drives hydraulic pressure booster 10 to boost the pressure of the purified amine before entering contactor 156.

One drawback to the configuration of FIG. 16 is that the amine pump may not be able to produce enough pressure to establish amine circulation through contactor 156 when starting the purification process. Without an initial amine flow, the hydraulic pressure booster 10 cannot generate the additional pressure boost required. This situation may occur if contactor 1S6 has no amine charge and was fully pressurized with gas before start up.

Figure 17:
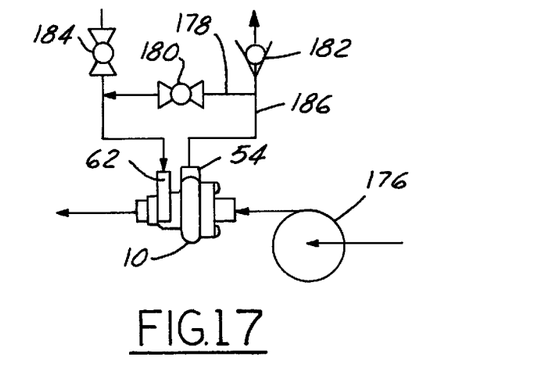
FIG. 17 is a partial schematic view of an amine feedback circuit to improve the process of FIG. 16.

Referring now to FIG. 17, an improvement to FIG. 16 is illustrated that permits a "boot-strap" start up of the purification system of FIG. 16. In this embodiment, a bypass pipe 178 having a bypass valve 180 is coupled between pump outlet 54 and turbine inlet 62. A check valve 182 in lean amine pipe 186 prevents backflow of high pressure gas. A control valve 184 regulates flow from contactor 156.

In operation, during start up, pump 176 is engaged and bypass control valve 180 is fully opened while control valve 184 is closed. Thus the entire amine flow from pump 176 is directed into hydraulic pressure booster 10 to increase the pressure in the lean amine pipe 186. The pressure boost from hydraulic pressure booster 10 plus the pressure from pump 176 will open the check valve since the combined pressure will exceed the pressure in contactor 156. Once check valve 182 opens, bypass valve 180 is closed and valve 184 is opened. The process is now self-sustaining because an amine charge has been established.

Figure 18:
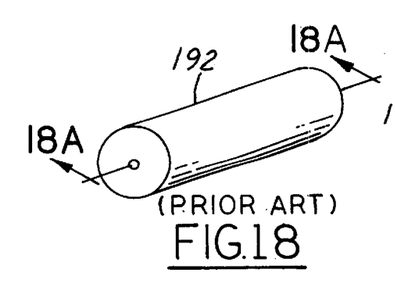
FIG. 18 is a perspective view of a membrane for a reverse osmosis system of the prior art.
Figure 18A:
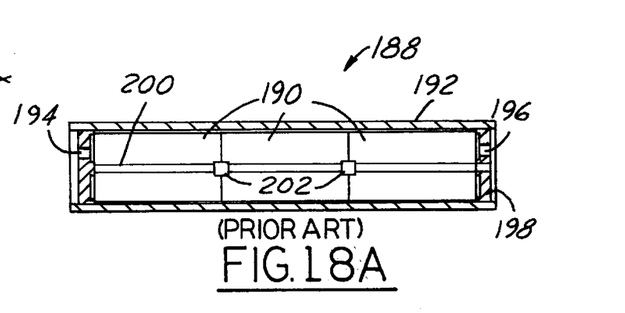
FIG. 18A is a cross-sectional view of a reverse osmosis system according to the prior art.

Referring now to FIGS. 18 and 18A, the present invention may also be used in a reverse osmosis system.

A known reverse osmosis system 188 is illustrated having a plurality of membranes 190. In a typical reverse osmosis system, membranes are often placed in series in a cylindrical pressure vessel 192. Feedwater at high pressure enters vessel 192 through a feed inlet 194 located in an end cap 198. Brine leaves pressure vessel 192 through an outlet 196 in end cap 198. A portion of the fluid passes through membranes 190 and into a collection tube 200. Each membrane 190 has a collection tube that is joined to an adjacent tube by a sealing joint 202. The permeate fluid collected in collection tube 200 exits end cap 198 at a low pressure. Fluid exiting through outlet 196 is at a high pressure.

Figures 19, 20:
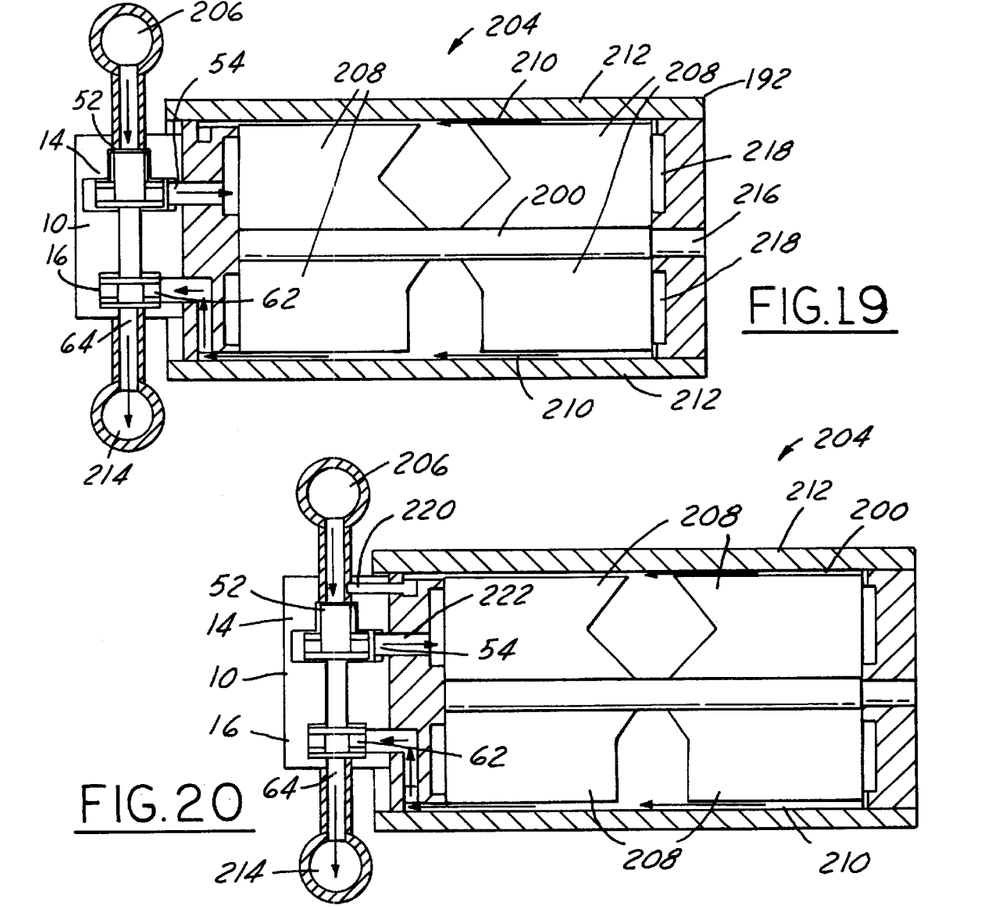
FIG. 19 is a cross-sectional view of a reverse osmosis system having a hydraulic pressure booster according to the present invention.
FIG. 20 is a cross-sectional view of a reverse osmosis system having a feedback channel and a pressure booster according to the present invention.

Referring now to FIG. 19, a reverse osmosis system 204 is illustrated incorporated with a hydraulic pressure booster 10 having a feed inlet 52 coupled to a feed header 206. Pump outlet 54 is coupled to provide pressurized fluid to membranes 208. An annular passage 210 is provided between outer walls 212 and membranes 208. Annular passage 210 supplies brine under high pressure to inlet 62 of turbine portion 16 of hydraulic pressure booster 10. Turbine outlet 64 is coupled to a brine header 214 that removes the unwanted brine from the system.

In operation, feed from pump portion 14 is pressurized and placed within membranes 208. The feed fluid flows through membranes 208 and collects in brine channels 218. Brine channels 218 through annular passage 210 returns the brine to hydraulic pressure booster 10 under pressure. The pressurized brine enters turbine inlet 62 and converts the high pressure fluid into a low pressure fluid. The work provided by the brine rotates pump portion 14. Low pressure purified fluid is removed from the system through outlet 216.

Advantageously, the implementation of a hydraulic pressure booster 10 into a reverse osmosis system as described, eliminates high pressure piping and thus reduces the size and complexity of such a system.

Referring now to FIG. 20, and embodiment similar to that shown above in FIG. 19 is illustrated. Reverse osmosis system 204 has a recirculation passage 220 that connects annular end cap brine channel 222 to inlet port 52. This embodiment is similar in operation to FIG. 11 illustrated above. In operation, a portion of brine passes through recirculation channel 222 for recirculation through membrane array. The size of recirculation channel 220 is constricted to provide the desired ratio of recirculation flow to pump inlet 52 without unduly restricting the flow into turbine inlet 62.

Figure 21:
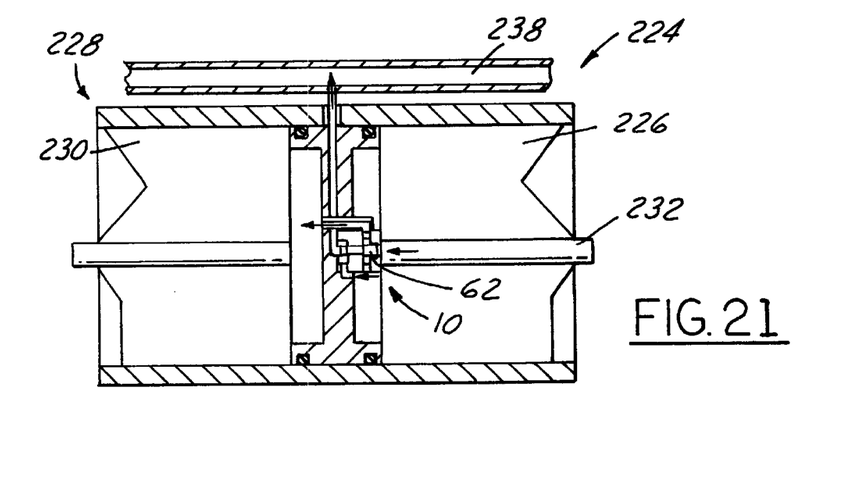
FIG. 21 is a partial cross-sectional view of a reverse osmosis system having a hydraulic pressure booster in between two membrane stages.
Figure 22:
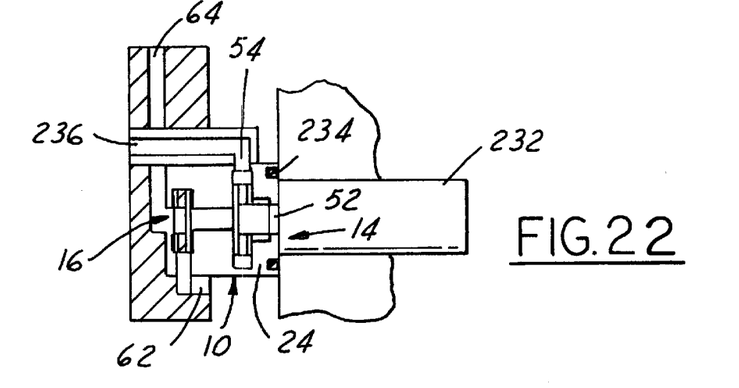
FIG. 22 is an enlarged cross-sectional view of a portion of FIG. 21.

Referring now to FIGS. 21 and 22, sometimes the permeate discharge from a reverse osmosis system is not pure enough. In these circumstances, the permeate may be re-pressurized and admitted to a second stage reverse osmosis system for further purification. Such a process is similar in operation to FIGS. 12 and 13 illustrated above. In this embodiment, a hydraulic pressure booster 10 is used to boost the pressure between successive stages of the reverse osmosis system. In this example, a first stage 224 has a first membrane 226 and a second stage having a second membrane 230. Low pressure permeate collects in collection tube 232 which is coupled to feed inlet 52 of hydraulic pressure booster 10. An O-ring 234 seals collection tube 232 to inlet 52. High pressure permeate travels through pump portion 14 and exits through pump outlet 54. Pump outlet is coupled to the inlet 236 to second stage 228. High pressure brine enters turbine portion 16 through turbine inlet 62. The high pressure brine solution operates turbine portion and is discharged turbine outlet 64. Turbine outlet 64 is coupled to a brine header 238.

Figure 23:
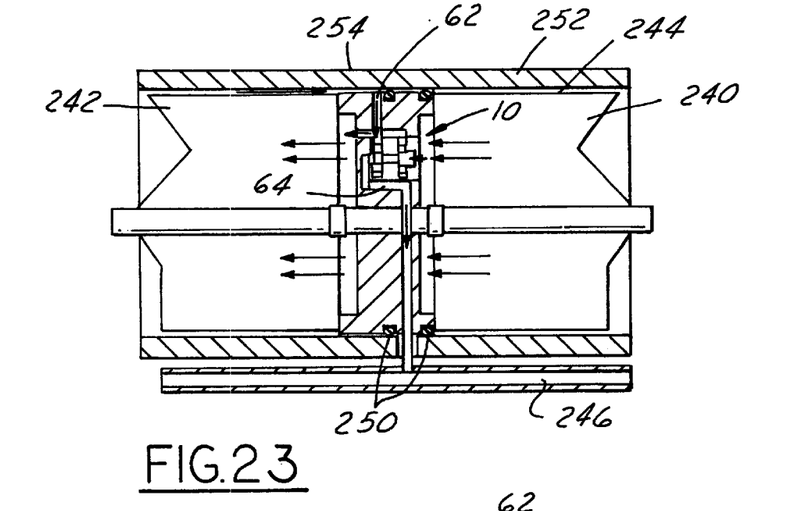
FIG. 23 is a partial cross-sectional view of a reverse osmosis system having two consecutive chambers, one being higher than the other, and a hydraulic pressure booster according to the present invention.
Figure 24:
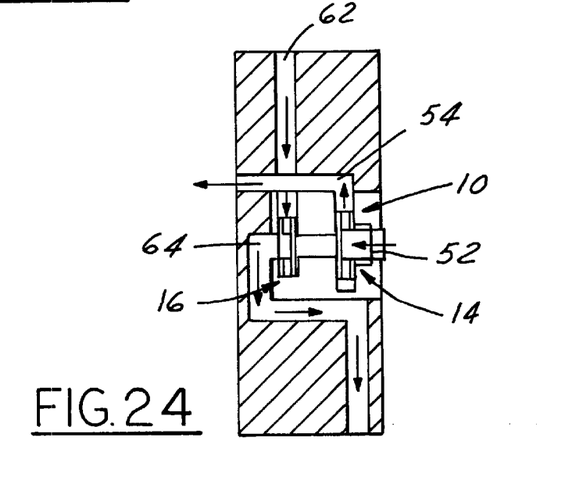
FIG. 24 is an enlarged cross-sectional view of the hydraulic pressure booster incorporated into FIG. 23.

Referring now to FIGS. 23 and 24, an inherent characteristic of a reverse osmosis system is that the optimal pressure for a membrane increases as fluid passes through the membrane. Thus, a stepped process similar in operation to that disclosed in FIG. 15 is illustrated. Hydraulic pressure booster 10 is located between membrane 240 and membrane 242. In this embodiment, turbine portion 16 has an inlet 62 coupled to a brine return channel 244 under high pressure. Turbine outlet 64 is coupled to a low pressure brine header 246. Brine exiting membrane 240, enters feed inlet 52 of the pump portion 14 of hydraulic pressure booster 10. Hydraulic pressure booster 10 boosts the pressure of the fluid from feed inlet 52 and through pump outlet 54 provides the higher pressure partially processed fluid to membrane 242 for further permeate extraction.

In this embodiment, a substantial portion of the external piping typically associated with a reverse osmosis system has advantageously been eliminated. Also in this embodiment, O-rings 250 are used to prevent leakage through a clearance in outer walls 252 of pressure vessel 254.

Figure 25:
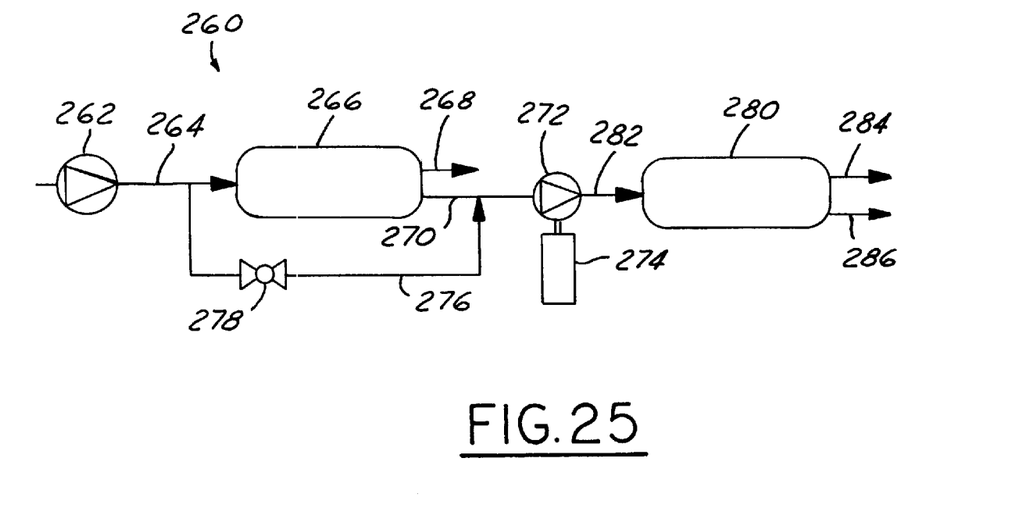
FIG. 25 is a schematic view of a two-stage reverse osmosis system according to another embodiment of the invention.

Referring now to FIG. 25, a reverse osmosis system 260 is illustrated. Spiral wound membranes are often used in reverse osmosis systems. Spiral wound membranes require that a certain fluid velocity along the feed channel is maintained to promote turbulence. A high level of turbulence is needed to minimize boundary layer formation and consequential localized concentration of high TDS liquid along the membrane surface. Membranes also have an optimal permeate flux rate which is the rate of permeation through a given area of the membrane. The flux rate is mainly determined by the transmembrane pressure and the osmotic pressure of the feed. Transmembrane pressure is the pressure difference between the feed and the permeate sides of the membrane. Osmotic pressure is proportional to the TDS (total dissolved solids) of the fluid stream. In prior reverse osmosis devices, the desire to maintain the optimal feed velocity and permeate flux rate has not been successfully addressed. Oftentimes staged membrane arrays are used with membranes linked in parallel with each successive stage handling brine from the preceding stage. Each successive stage has fewer membranes in parallel which has helped to maintain feel velocity in each stage as feed flow is reduced from stage to stage due to membrane permeation. Staged systems, however, suffer from reduced flux rates in each successive stage due to the loss in transmembrane pressure caused by feed channel flow resistance and increased osmotic pressure due to membrane permeation. Interstage booster pumps are often employed in the prior art to compensate for increased TDS and flow channel pressure losses. However, the prior art systems do not employ a staged configuration in which each stage uses the same number of membranes. This is because the feed velocities typically cannot be maintained from stage to stage.

In FIG. 25, the reverse osmosis system has a feed pump 262 coupled to a feed pipe 264 that is fluidically coupled to a first process chamber 266. First process chamber 266 preferably houses a reverse osmosis membrane as described above. First process chamber 266 has a permeate pipe 268 that is under low pressure and a brine pipe 270 under high pressure. The brine pipe 270 may, for example, be coupled to an interstage header. A booster pump 272 may be coupled to brine pipe 270. Booster pump 272 may, for example, be driven by a motor 274. A side stream pipe 276 is coupled between feed pipe 264 and pump 272. A control valve 278 may be coupled within side stream pipe 276 to regulate the flow of fluid through side stream pipe 276 and to pump 272. A second process chamber 280 has a second feed pipe 282 that is coupled to the outlet of pump 272. Process chamber 280 also has a permeate pipe 284 and a brine pipe 286.

In operation, fluid is coupled through process chamber 266 which has an output of high pressure concentrate brine at brine pipe 270. Low pressure permeate leaves first process chamber 266 through permeate pipe 268. Because the pressure at brine pipes 270 (at the input of pump 272) is lower than the pressure of feed pipe 264, fluid flows through side stream pipe 276 to pump 272. Valve 278 regulates the flow through side stream pipe 276. The pressure of the flow exiting pump 272 should equal the pressure in feed pipe 264 plus the increase in osmotic pressure of the interstage flow relative to the feed flow in pipe 264. The combined flow rate through pump 272 should equal the flow rate through feed pipe 264. That is, the flow rate through side stream pipe 276 equals the flow rate of permeate pipe 268.

In process chamber 280, the transmembrane pressure of the membrane contained therein is the same as the transmembrane pressure of first process chamber 266. Thus, permeate flux rates are identical in each membrane. Therefore, each membrane is operating at substantially an optimal condition of feed velocity and flux rate.

Figure 26:
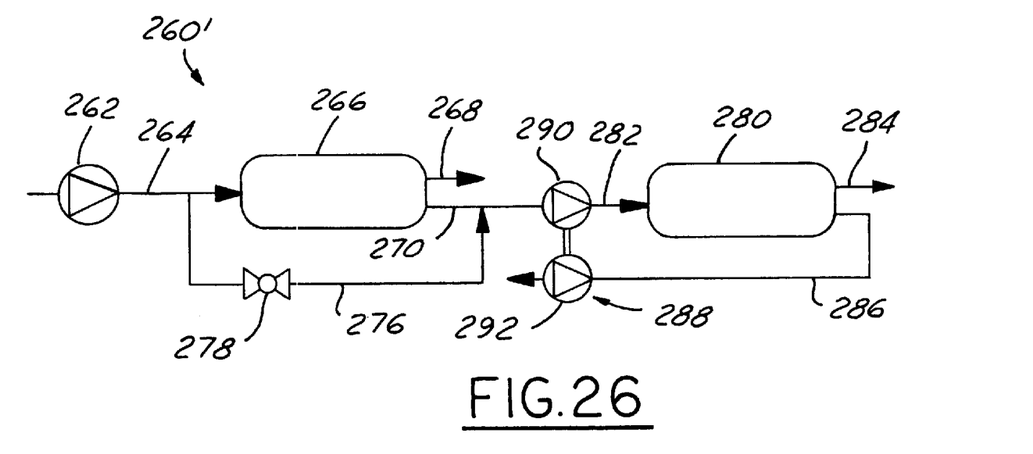
FIG. 26 is a second embodiment of FIG. 25 having a hydraulic pressure booster according to the present invention.

Referring now to FIG. 26, a similar embodiment to that shown in FIG. 25 is illustrated. In this embodiment, a reverse osmosis system 260' is illustrated having a hydraulic pressure booster 288 in place of pump 272 illustrated above. Hydraulic pressure booster has a pump portion 290 and a turbine portion 292. Hydraulic pressure booster 288 may be formed according to the present invention described above. In this embodiment, pump portion is coupled between brine pipe 270 and feed pipe 282 while turbine portion is coupled to second brine pipe 286 of second process chamber 280.

In operation, the second embodiment 260' operates in a similar fashion to that described above with respect to FIG. 25 except that the high pressure fluid leaving brine pipe 286 is now harnessed to drive hydraulic pressure booster 288. That is, turbine portion 292, moved by the discharge brine from brine pipe 286, is used to rotate pump portion 290.

Of course, those skilled in the art would recognize various alternatives to those shown in FIGS. 25 and 26. For example, additional pumps may be incorporated, for example, adjacent to hydraulic pressure booster 288 if brine pipe 286 does not provide sufficient pressure to rotate turbine portion 292 in order to generate sufficient pressure from pump portion 290.

While particular embodiments of the invention have been shown and described, numerous variations and alternate embodiments will occur to those skilled in the art. Accordingly, it is intended that the invention be limited only in terms of the appended claims.

What is claimed is:

1. A hydraulic pressure booster comprising:
   a housing having a pump portion, a shaft support portion and a turbine portion, said pump portion having a pump inlet, a pump outlet, said turbine portion having a turbine inlet and a turbine outlet;
   a rotor having a shaft, an pump impeller and a turbine impeller, said shaft defining a longitudinal axis of said housing;
   a center bearing positioned between said housing and said shaft, said center bearing rotatably coupling said shaft to said housing, whereby upon rotation of said rotor a thrust force along said longitudinal axis is generated;
   a thrust bearing having a groove in a thrust bearing face adjacent said turbine impeller and a channel fluidicaly couplgte turbine outlet and groove, said thrust bearing generating a force opposite to said thrust force; and
   a thrust load reducer within said turbine portion generating a a second force opposite to said thrust force.

2. A hydraulic pressure booster as recited in claim 1 wherein said thrust load reducer is comprised of a stationary seal ring extending from said center bearing into said turbine portion and a seal ring extending from turbine impeller;
   said turbine seal ring, said stationary seal ring, said turbine impeller and said center bearing defining a balance space, said impeller having a channel fluidically coupling said balance space and an impeller eye.

3. A hydraulic pressure booster as recited in claim 1 wherein said center bearing comprises a first piece and a second piece.

4. A hydraulic pressure booster as recited in claim 1 wherein said shaft, said turbine impeller and said pump impeller are integrally formed as a unitary structure.

5. A hydraulic pressure booster as recited in claim 1 wherein said casing defining a pump volute region, said pump volute region offset toward said pump inlet in an axial direction.

6. A process apparatus comprising:
   a first process chamber having a first chamber inlet and a first chamber outlet;
   a hydraulic pressure booster as recited in claim 1, wherein said first chamber inlet is coupled to said pump outlet and said chamber outlet is coupled to said turbine inlet.

7. A process apparatus as recited in claim 6 further comprising a feed pump, said first chamber inlet coupled to said feed pump.

8. A process apparatus as recited in claim 6 wherein said first pump inlet is coupled to said first chamber outlet.

9. A process apparatus comprising:
   a first process chamber having a first chamber inlet, a first chamber outlet and a second chamber outlet;
   a second process chamber having a second chamber inlet and a third chamber output;
   a hydraulic pressure booster as recited in claim 1;
   a feed pump coupled to said first chamber inlet,
      wherein said first chamber outlet is coupled to said turbine inlet, said second chamber outlet coupled to a said pump inlet, said pump outlet is coupled to said second chamber input.

10. A process apparatus comprising:
    a first process chamber having a first chamber inlet and a first chamber outlet and a second chamber outlet;
    a second process chamber having a second chamber input and a third chamber output;
    a hydraulic pressure booster as recited in claim 1;
    a feed pump coupled to said first chamber inlet,
       wherein said first chamber outlet coupled to said pump inlet, said pump outlet coupled to said second chamber input, said third chamber output coupled to said turbine input.

11. A natural gas purification system comprising:
    a contactor having a plurality of trays therein, an amine inlet and an amine outlet, a natural gas input and a purified natural gas output,
    a purification tank;
    a hydraulic pressure booster according to claim 1 wherein said turbine inlet is coupled to said amine outlet, said turbine outlet is coupled to said purification tank, said pump inlet is coupled to said purification tank and said pump outlet is coupled to said amine input.

12. A natural gas purification system as recited in claim 11 further comprising a bypass valve coupled between said pump outlet and said turbine input.

13. A reverse osmosis process apparatus comprising:
    a pressure vessel;
    a membrane positioned within said pressure vessel whereby said so that an annular passage is form therebetween,
    a collection tube collecting from said membrane;
    a hydraulic pressure booster as recited in claim 1 wherein turbine inlet is fluidically coupled to said annular passage, said pump inlet is coupled to a fluid source and said pump outlet is coupled to said membrane.

14. A reverse osmosis process apparatus as recited in claim 13 further comprising a recirculation passage coupled between said pump inlet and said annular passage.

15. A reverse osmosis process apparatus comprising:
    a pressure vessel having a first stage and a second stage, said first stage having a permeate outlet, said second stage having a stage inlet;
    a first membrane positioned within said first stage whereby said so that an annular passage is form therebetween,
    a collection tube collecting from said membrane;
    a hydraulic pressure booster as recited in claim 1 wherein turbine inlet is fluidically coupled to said annular passage, said pump inlet is coupled to said permeate outlet and said pump outlet is coupled to said stage inlet.

16. A hydraulic pressure booster as recited in claim 1 wherein said thrust load reducer comprises:

radial grooves on said turbine impeller adjacent to said bearing; and a bleed hole in said turbine impeller.

17. A hydraulic pressure booster comprising:

a housing having a pump portion, a shaft support portion and a turbine portion, said pump portion having a pump inlet, a pump outlet, said turbine portion having a turbine inlet and a turbine outlet and an turbine impeller cavity;

a rotor having a shaft, an pump impeller and a turbine impeller, said shaft defining a longitudinal axis of said housing, said turbine impeller having a shroud and an open turbine impeller eye;

a center bearing positioned between said housing and said shaft, said center bearing rotatably coupling said shaft to said housinge whereby upon rotation of said rotor a thrust force along said longitudinal axis is generated; and a thrust load reducer within said turbine portion generating a counterforce opposite said trust force, said thrust load reducer comprises a bleed hole in said turbine impeller, said bleed hole comprising fluidically coupling said turbine impeller eye and an area adjacent said center bearing through said shroud.

18. A hydraulic pressure booster as recited in claim 17 further comprising a thrust bearing secured within said housing adjacent to said turbine impeller, fluidically coupling the turbine outlet and a groove in a thrust bearing face, said thrust bearing generating a counterforce opposite said thrust force.

19. A hydraulic pressure booster as recited in claim 17 wherein said thrust load reducer further comprises radial grooves on said turbine impeller adjacent to said bearing.

20. A hydraulic pressure booster comprising:

a housing having a pump portion, a shaft support portion and a turbine portion, said pump portion having a pump inlet, a pump outlet, said turbine portion having a turbine inlet and a turbine outlet;

a rotor having a shaft, an pump impeller and a turbine impeller, said shaft defining a longitudinal axis of said housing;

a center bearing positioned between said housing and said shaft, said center bearing rotatably coupling said shaft to said housing, whereby upon rotation of said rotor a thrust force alone said longitudinal axis is generated; and a first seal and a second seal, said first seal, second seal, said center bearing and said housing defining an annular space therebetween, said first seal having a notch therein; said annular space has a first pressure substantially the same as a pump pressure.

21. A hydraulic pressure booster comprising:

a housing having a pump portion, a shaft support portion and a turbine portion, said pump portion having a pump inlet, a pump outlet, said turbine portion having a turbine inlet, a turbine outlet and a singular turbine volute;

a rotor having a shaft, an pump impeller and a turbine impeller, said shaft defining a longitudinal axis of said housing;

a center bearing positioned between said housing and said shaft, said center bearing rotatably coupling said shaft to said housing, whereby upon rotation of said rotor a thrust force along said longitudinal axis is generated; and said turbine portion comprises a primary nozzle passage and a secondary nozzle passage in fluid communication with said turbine volute, said turbine portion comprises a valve for selectably opening said secondary nozzle passage to increase fluid flow to said turbine volute.

22. A hydraulic pressure booster comprising:

a housing having a pump portion, a shaft support portion and a turbine portion, said pump portion having a pump inlet, a pump outlet, said turbine portion having turbine inlet and a turbine outlet;

a rotor having a shaft, an pump impeller and a turbine impeller, said shaft defining a longitudinal axis of said housing;

a center bearing positioned between said housing and said shaft, said center bearing rotatably coupling said shaft to said housing, whereby upon rotation of said rotor a thrust force along said longatudinal axis is generated; and wherein said pump portion comprises a unitary diffuser and wear ring.

23. A hydraulic pressure booster as recited in claim 22 wherein said housing comprises an end cap and casing, said casing securing said diffuser and wear ring within said casing.

24. A hydraulic pressure booster comprising:

a housing having a pump portion, a shaft support portion and a turbine portion, said pump portion having a pump inlet, a pump outlet, said turbine portion having a turbine inlet and a turbine outlet;

a unitary rotor having a shaft, an pump impeller and a turbine impeller, said shaft defining longitudinal axis of said housing;

a center bearing having a first piece and a second piece positioned between said housing and said shaft, said center bearing rotatably coupling said shaft to said housing;

a first seal;

a second seal spaced apart from said first seal, said first seal and said second seal positioned between said housing and said center bearing, said first seal, said second seal, said bearing and said housing defining an annular space, said first seal having a notch to fluidically couple said annular space to said pump; said annular space has a first pressure substantially the same as a pump pressure to provide a radially inward force on said first piece and said second piece during operation of said pump.

* * * * *